US012689116B2

(12) United States Patent
Lin et al.

(10) Patent No.: US 12,689,116 B2
(45) **Date of Patent: *Jul. 21, 2026**

(54) ANTENNA STRUCTURE CAPABLE OF TRANSMITTING A WiGig BAND AND HEAD-MOUNTED WIRELESS TRANSMISSION DISPLAY DEVICE

(71) Applicant: HTC CORPORATION, Taoyuan City (TW)

(72) Inventors: Sheng Cherng Lin, Taoyuan City (TW); Hsiao-Ling Chan, Taoyuan City (TW); Chen-Hao Chang, Taoyuan City (TW); Chien-Chih Chen, Taoyuan City (TW)

(73) Assignee: HTC CORPORATION, Taoyuan City (TW)

( * ) Notice: Subject to any disclaimer, the term of this patent is extended or adjusted under 35 U.S.C. 154(b) by 47 days.

This patent is subject to a terminal disclaimer.

(21) Appl. No.: 19/004,109

(22) Filed: Dec. 27, 2024

(65) Prior Publication Data

US 2025/0141097 A1 May 1, 2025

Related U.S. Application Data

(60) Continuation of application No. 18/428,197, filed on Jan. 31, 2024, now Pat. No. 12,218,412, which is a (Continued)

(51) Int. Cl.
H01Q 1/27 (2006.01)
G02B 27/01 (2006.01)
(Continued)

(52) U.S. Cl.
CPC .......... H01Q 1/276 (2013.01); G02B 27/017 (2013.01); H01Q 1/084 (2013.01); H01Q 21/06 (2013.01); H01Q 21/28 (2013.01); A63F 13/235 (2014.09)

(58) Field of Classification Search
CPC .......... H01Q 1/084; H01Q 1/276; H01Q 1/22; H01Q 1/273; H01Q 3/02; H01Q 21/06;
(Continued)

(56) References Cited

U.S. PATENT DOCUMENTS 5,696,521 A 12/1997 Robinson et al.
5,986,813 A 11/1999 Saikawa et al.
(Continued)

FOREIGN PATENT DOCUMENTS

CN 1735156 A 2/2006
CN 201178130 Y 1/2009
(Continued)

OTHER PUBLICATIONS

Chinese Office Action mailed Dec. 26, 2019, Chinese Patent Application No. 201810857014.3, 9 Pages.

(Continued)

*Primary Examiner* — Robert Karacsony
(74) *Attorney, Agent, or Firm* — Birch, Stewart, Kolasch & Birch, LLP

(57) ABSTRACT

An antenna structure is capable of transceiving signals for a head-mounted wireless transmission display device including a display screen assembly. The antenna structure includes at least two body portions. Each of the body portions has at least a signal transceiving end. The body portions are respectively arranged at left and right sides of the display screen assembly. The signal transceiving ends of the body portions are extended outward from the left and right sides of the display screen assembly respectively. A first distance between the two signal transceiving ends is greater than a width of the display screen assembly.

12 Claims, 17 Drawing Sheets

Related U.S. Application Data division of application No. 17/093,502, filed on Nov. 9, 2020, now Pat. No. 11,942,680, which is a continuation of application No. 16/052,490, filed on Aug. 1, 2018, now Pat. No. 10,868,352.

(60) Provisional application No. 62/539,904, filed on Aug. 1, 2017.

(51) Int. Cl.
*H01Q 1/08* (2006.01)
*H01Q 21/06* (2006.01)
*H01Q 21/28* (2006.01)
*A63F 13/235* (2014.01)

(58) Field of Classification Search
CPC ....... H01Q 21/28; G02B 27/017; A63F 13/23; A63F 13/235; A63F 2250/497; A63F 2300/8082
See application file for complete search history.

(56) References Cited

U.S. PATENT DOCUMENTS

| | | | |
|---|---|---|---|
| 10,146,302 | B2 | 12/2018 | Tokubo |
| 12,218,412 | B2 * | 2/2025 | Lin .................... H01Q 1/276 |
| 2016/0134336 | A1 | 5/2016 | Persson |
| 2017/0045941 | A1 | 2/2017 | Tokubo et al. |

| | | | |
|---|---|---|---|
| 2017/0115839 | A1 | 4/2017 | Park et al. |
| 2018/0259778 | A1 | 9/2018 | Pu et al. |
| 2018/0323508 | A1 | 11/2018 | Chigusa et al. |
| 2019/0214709 | A1 | 7/2019 | Frishman et al. |

FOREIGN PATENT DOCUMENTS

| | | | |
|---|---|---|---|
| CN | 102820520 | A | 12/2012 |
| CN | 204316529 | U | 5/2015 |
| CN | 205562962 | U | 9/2016 |
| JP | 2002-247484 | A | 8/2002 |
| JP | 2016-219897 | A | 12/2016 |
| WO | WO 2017/086290 | A1 | 5/2017 |

OTHER PUBLICATIONS

EPO Examiner Ruggero Taddei, The Extended European Search Report mailed on Jan. 3, 2019 in European Patent Application No. 18186763.1, 8 pages.

EPO, The Extended European Search Report Mailed Feb. 13, 2020, European Patent Application No. 19214418.6, 7 Pages.

Taiwanese Office Action mailed Nov. 18, 2019, Taiwanese Patent Application No. 10821088490, 8 Pages.

Taiwanese Office Action mailed on Mar. 18, 2020, Taiwanese Patent Application No. 107126502, total 4 pages.

TIPO, Taiwanese Office Action issued on Apr. 23, 2021 in Taiwanese Application No. 107126502, 13 pages.

* cited by examiner

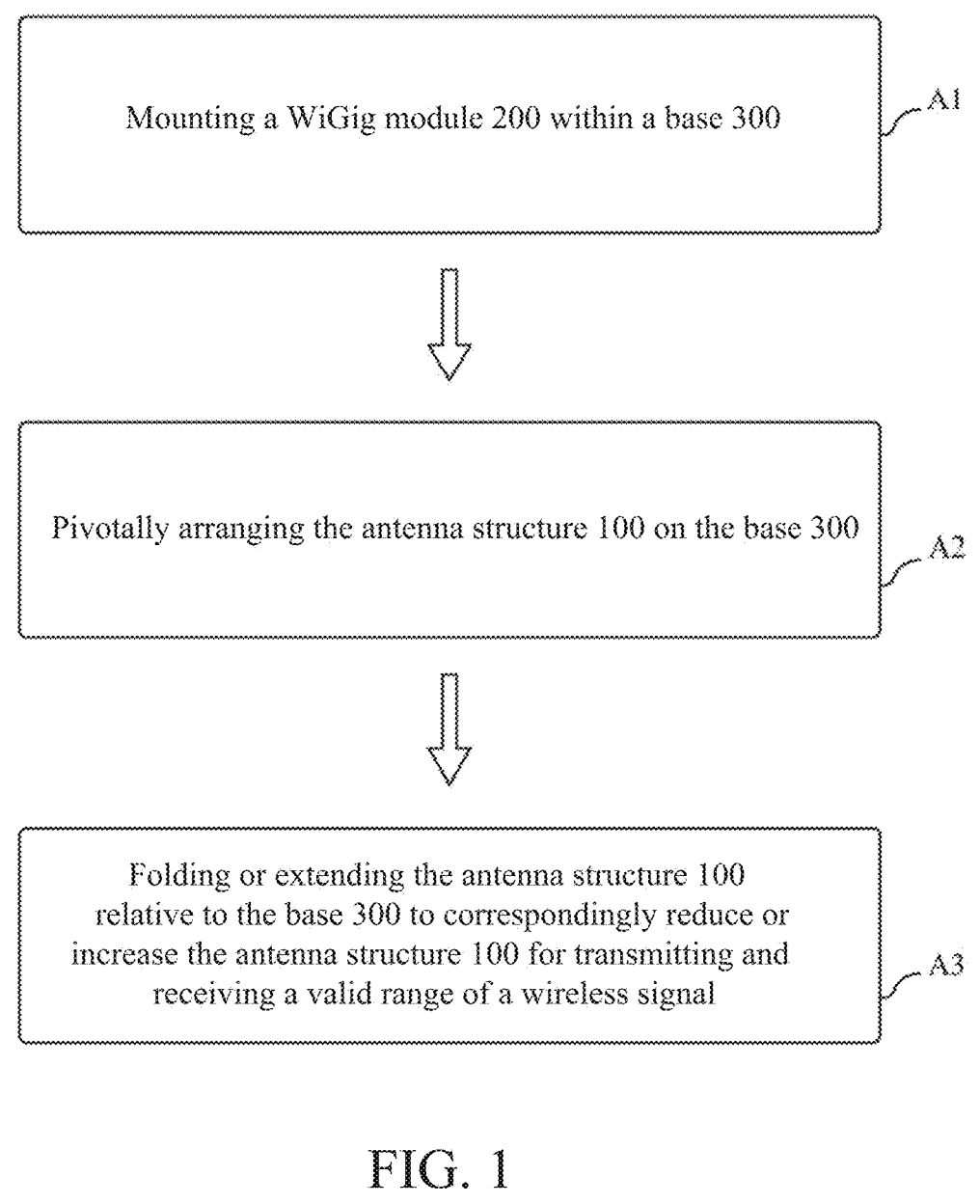

Mounting a WiGig module 200 within a base 300 — A1

Pivotally arranging the antenna structure 100 on the base 300 — A2

Folding or extending the antenna structure 100
relative to the base 300 to correspondingly reduce or
increase the antenna structure 100 for transmitting and
receiving a valid range of a wireless signal — A3

FIG. 1

Disposing an antenna structure 100 on a VR device 400 — B1

Folding or extending the antenna structure 100 with respect to the VR device 400 to correspondingly reduce or increase the antenna structure 100 for transmitting and receiving a valid range of a wireless signal — B2

ANTENNA STRUCTURE CAPABLE OF TRANSMITTING A WiGig BAND AND HEAD-MOUNTED WIRELESS TRANSMISSION DISPLAY DEVICE

CROSS REFERENCE TO RELATED APPLICATIONS

This application is a Continuation Application of U.S. patent application Ser. No. 18/428,197, filed on Jan. 31, 2024, which is a Divisional application of U.S. patent application Ser. No. 17/093,502, filed on Nov. 9, 2020, which is a Continuation application of U.S. patent application Ser. No. 16/052,490, filed Aug. 1, 2018 (now U.S. Pat. No. 10,868,352, issued Dec. 15, 2020) which claims priority of U.S. Provisional Application Ser. No. 62/539,904, filed Aug. 1, 2017, the entirely of which is incorporated by reference herein.

BACKGROUND OF THE INVENTION

Field of the Invention

The present invention relates to an antenna structure and a method of folding and extending the antenna structure, and more particularly, relates to an antenna structure capable of transmitting a WiGig band and a method of folding and extending the antenna structure.

Description of the Related Art

As compared to the Wi-Fi wireless area network technology currently available covering frequency bands of 2.4 GHz and 5 GHz, the WiGig wireless area network technology that performs signal transmission based on the frequency band of 60 GHz can transmit data at a speed up to 7 Gbit/s, so the development of the new generation of WiGig technology has drawn the attention of various manufactures in modern society where mobile devices are quite popular.

However, although the new generation of WiGig technology has less interference because of using a new frequency band as compared to the Wi-Fi technology current available, signals transmitted over the frequency band of 60 GHz are very likely to be blocked by objects such as walls, ceilings and floors, and the transmission thereof is limited to a distance of 10 meters. Therefore, devices adopting the WiGig technology for wireless transmission of data need to overcome problems of a poor penetrability and a short transmission distance or the like.

Moreover, an antenna for receiving the aforesaid signals also has a problem in directivity. Once an antenna for receiving a signal is not aligned with a signal transmitting end, problems such as incorrect or incomplete data receiving will occur, thereby causing delay in data transmission.

For example, the virtual reality (VR) technology that can provide a user with a feeling of being personally on the scene needs to transmit a large amount of real-time information for operating, displaying and feeding back by a processor during the operation thereof. Thus, for stable usage, the VR devices currently available achieve transmission of massive data flow by the arrangement of physical lines (e.g., network lines, HDMI or the like). Once the VR devices change into transmitting the aforesaid data flow in a wireless way, only the transmission speed and the data amount of the WiGig technology can satisfy requirements thereof.

However, in consideration that actions of a user wearing the VR device during an activity, e.g., shaking of the body to the left and the right, turning back, bowing or the like, all might influence the directivity of the antenna carried on the VR device, it is necessary to perform optimization on the antenna carried on the VR device adopting the WiGig technology, thereby ensuring the stability in wireless transmission of the data.

Accordingly, an urgent need exists in the art to provide an antenna structure of a high directivity and a method of folding and extending the antenna structure, thereby ensuring the stability during the wireless transmission of the data and making it convenient for the antenna structure to be stored and carried by users.

BRIEF SUMMARY OF THE INVENTION

An objective of the present invention is to provide an antenna structure capable of transmitting a WiGig band and a method of folding and extending the antenna structure, and the antenna position of the antenna structure can be adjusted in response to different usage modes, thereby maintaining the directivity thereof to ensure the stability in data transmission, and meanwhile making it convenient to be stored and carried by users.

In an exemplary embodiment, the invention is directed to an antenna structure capable of transceiving signals for a head-mounted wireless transmission display device including a display screen assembly. The antenna structure includes at least two body portions. Each of the body portions has at least a signal transceiving end. The body portions are respectively arranged at left and right sides of the display screen assembly. The signal transceiving ends of the body portions are extended outward from the left and right sides of the display screen assembly respectively. A first distance between the two signal transceiving ends is greater than a width of the display screen assembly.

In another exemplary embodiment, the invention is directed to an antenna structure capable of transceiving signals for a head-mounted wireless transmission display device including a display screen assembly. The antenna structure includes at least two body portions. Each of the body portions has a pivoting end and a signal transceiving end opposite to the pivoting end. Each of the pivoting ends is pivotally disposed on the display screen assembly. The body portions are respectively arranged at left and right sides of the display screen assembly. The signal transceiving ends of the body portions are extended outward from the left and right sides of the display screen assembly respectively.

The detailed technology and preferred embodiments implemented for the subject invention are described in the following paragraphs accompanying the appended drawings for people skilled in this field to well appreciate the features of the claimed invention.

BRIEF DESCRIPTION OF DRAWINGS

The invention can be more fully understood by reading the subsequent detailed description and examples with references made to the accompanying drawings, wherein:

FIG. 1 is flowchart diagram of a first aspect of a method for folding and extending an antenna structure capable of transmitting a WiGig band according to the present invention;

DETAILED DESCRIPTION OF THE INVENTION

Figure 2A:
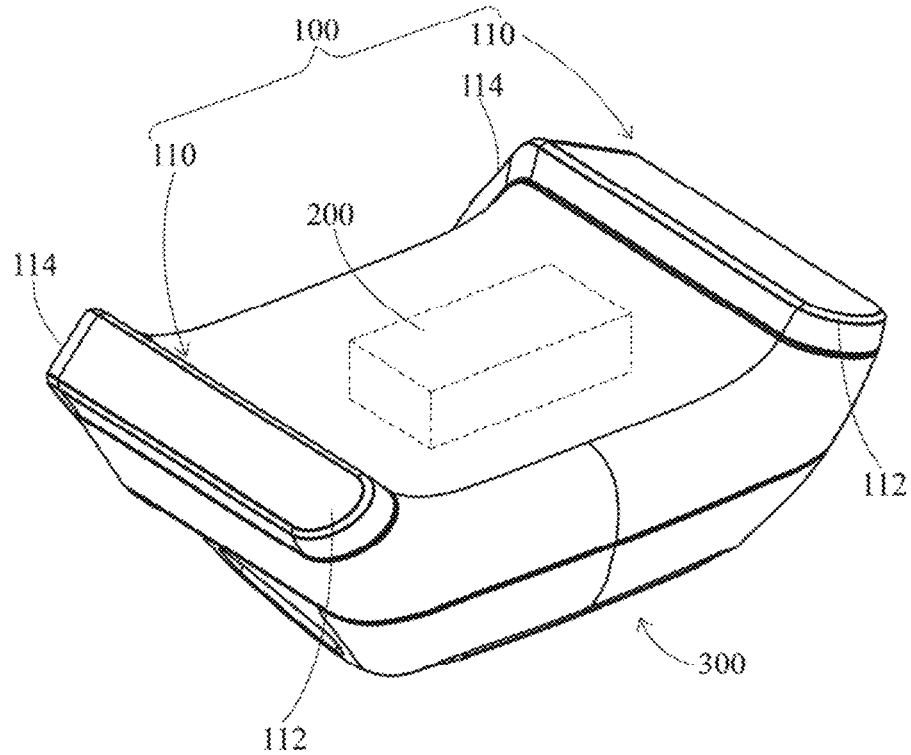
FIG. 2A to FIG. 2B are schematic views at different viewing angles of the antenna structure in the folded state in the method according to the present invention.

In the following description, the present invention will be explained with reference to embodiments thereof. However, these embodiments listed herein are not intended to limit the present invention to any specific examples, embodiments, environment, applications or particular implementations described in these exemplary embodiments. Therefore, description of these exemplary embodiments is only for purpose of illustration rather than to limit the present invention.

As shown in FIG. 1, in a method of folding and extending an antenna structure 100 capable of transmitting a WiGig band according to the present invention, the antenna structure 100 is optimized in the following steps: first, mounting a WiGig module 200 capable of transmitting a WiGig band within a base 300, as shown in step A1; next, pivotally arranging the antenna structure 100 on the base 300, as shown in step A2; and folding (i.e., storing) or extending (i.e., opening or spreading outwardly) the antenna structure 100 relative to the base 300 to correspondingly reduce or increase the antenna structure 100 for transmitting and receiving a valid range of a wireless signal based on the WiGig technology.

As shown in FIG. 2A to FIG. 2D, in a preferred embodiment of the present invention, the antenna structure 100 comprises two body portions 110, and each of the two body portions 110 has a pivoting end 112 and a signal transceiving end 114 opposite to the pivoting end 112. In other words, the pivoting end 112 and the signal transceiving end 114 are respectively disposed at two opposite ends of the body portion 110. Each of the pivoting ends 112 is pivotally disposed on the base 300 at a first specific angle SA1 with respect to a horizontal plane, and each of the signal transceiving ends 114 is inclined downward by a second specific angle SA2 with respect to the body portion 110 and disposed away from the body portion 110. By the special arrangement of the aforesaid first specific angle SA1 and the second specific angle SA2, gains can be obtained by the valid range for transceiving the wireless signal by the antenna structure 100 of this application, thereby reducing the probability of the occurring of signal dead corners.

Referring again to FIG. 2A to FIG. 2B, based on the above arrangements, when the antenna structure 100 is folded with respect to the base 300, the antenna structure 100 is adapted to exhibit an integrated appearance with the base 300, thereby achieving the effect of being stored and carried conveniently.

Figure 2B:
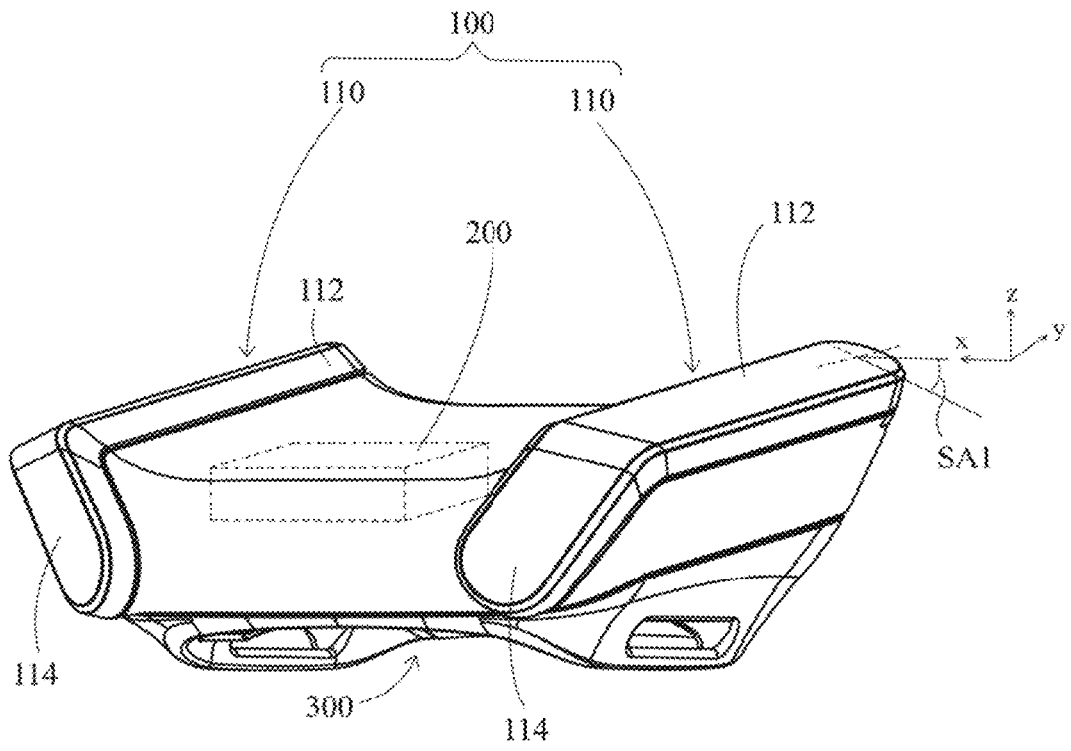
Figure 2C:
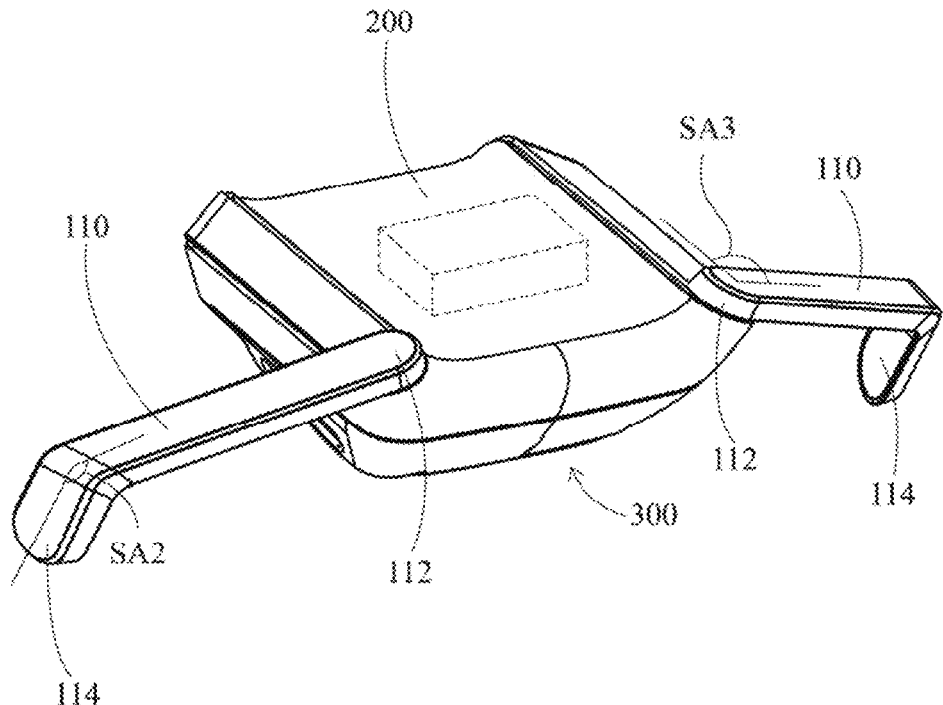
FIG. 2C to FIG. 2D are schematic views at different viewing angles of the antenna structure in the extended (opened) state in the method according to the present invention.
Figure 2D:
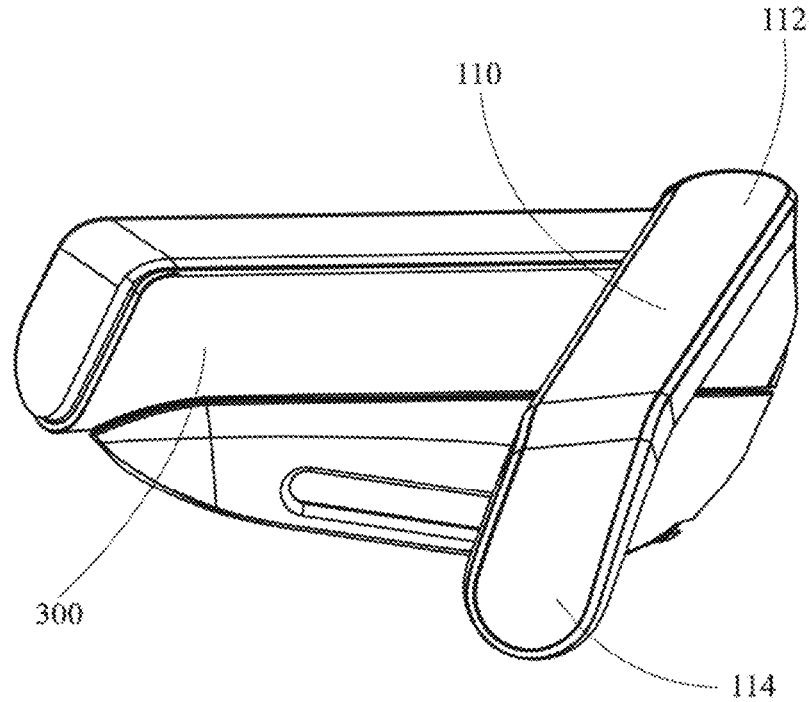

As shown in FIG. 2C to FIG. 2D, when the antenna structure 100 is extended relative to the base 300, the two body portions 110 are adapted to rotate a third specific angle SA3 outwardly relative to the base 300 so that the signal transceiving range with the forward direction as the main direction and the left-right direction as the auxiliary direction initially is extended to a signal transceiving range toward the forward, left-right and backward directions, and the signal transceiving range at this point instead takes the left-right direction as the main direction and the forward and backward directions as the auxiliary directions.

It shall be particularly appreciated that, although not shown in the aforesaid drawings, the aforesaid WiGig module 200 performs relevant signal transmission with the antenna structure 100 via connection of physical lines, as shall be readily appreciated by those of ordinary skill in the art. Moreover, the aforesaid base 300 is assumed to be disposed on the head of a user, but it is not limited thereto. The signal transmission relationships between the WiGig module 200 and the antenna structure 100 described above are also applicable to the following embodiments of the present application.

Figure 3A:
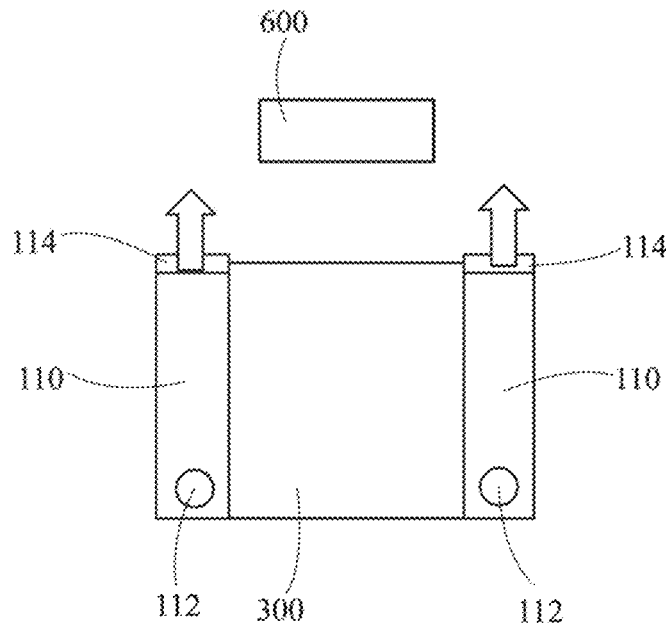
FIG. 3A is a schematic view illustrating relative positions between the antenna structure in the closed state and a signal transmitting end in the method according to the present invention.
Figure 3B:
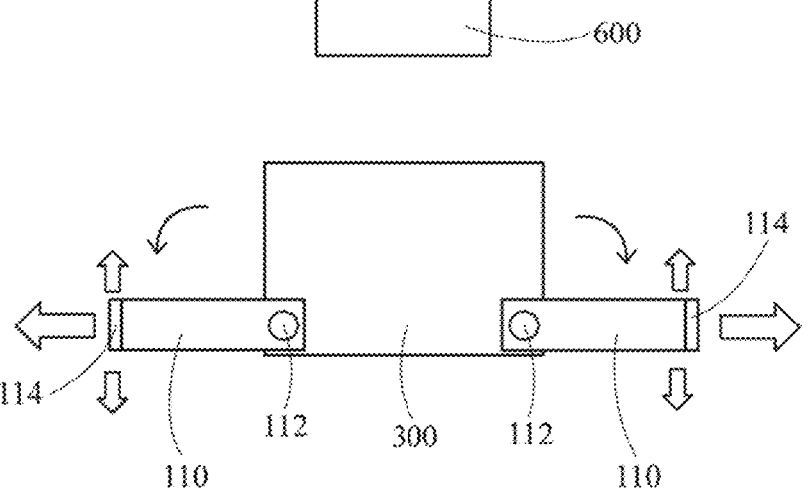
FIG. 3B is a schematic view illustrating relative positions between the antenna structure in the extended (opened) state and the signal transmitting end in the method according to the present invention.

FIG. 3A to FIG. 3B are taken as an example hereinafter to illustrate the wireless signal transmission state between the antenna structure 100 in the folded state or extended state of the present invention and a signal transmitting end 600.

First referring to FIG. 3A, FIG. 3A may be regarded as a special configuration of the antenna structure 100 in FIG. 2A to FIG. 2B that is folded on the base 300 without the first specific angle SA1 and the second specific angle SA2. In this case, because the signal transceiving end 114 is in the folded state with respect to the base 300, and a front surface of the signal transceiving end 114 that is configured to receive and transmit wireless signals directly faces the signal transmitting end 600 (i.e., a signal transceiving range with the forward direction as the main direction and the left-right direction as the auxiliary direction), the signal transceiving end 114 in the folded state is quite suitable for use by users in scenarios not requiring intense actions, e.g., static games and film viewing.

Similarly, FIG. 3B may be regarded as a special configuration of the antenna structure 100 in FIG. 2C to FIG. 2D that is extended on the base 300 without the first specific angle SA1 and the second specific angle SA2. In this case, because the signal transceiving end 114 is in the outwardly extended state with respect to the base 300 so that a front surface of the signal transceiving end 114 that is configured to receive and transmit wireless signals is toward the left and right sides of the base station 300, and left and right sides of the front surface of the signal transceiving terminal 114 may also have the function of transceiving wireless signals (i.e., a signal transceiving range with the left-right direction as the main direction and the forward and backward directions as the auxiliary directions), the transceiving range of the signal transceiving end 114 at this point is at a best reception position. In other words, even if the user is performing actions such as turning back, bowing, raising his/her head or other activities, one of the two signal transceiving ends 114 can still maintain the directivity and the connection with respect to the signal transmitting end 600, thereby ensuring that the reception of the data flow will not be influenced, and preventing operation delay caused by insufficient signal strength or errors in data flow reception during the data transmission by the user.

On the other hand, through the computation of an in-built signal processor, the signal transceiving end 114 in the extended state may also automatically detect and adjust the signal reception amount. For example, when the signal reception amount of one of the two signal receiving ends 114 is reduced due to excessively large movement of the body (e.g., turning the head to the left/right sides) of the user, the antenna structure 100 of the present invention will automatically switch the reception strength of another signal receiving end 114 to increase the signal reception amount, thereby ensuring the connection quality and preventing errors in the reception of data flow.

Figure 4:
FIG. 4 is flowchart diagram of a second aspect of the method for folding and extending the antenna structure capable of transmitting a WiGig band according to the present invention.

As shown in FIG. 4, the present invention additionally provides a method of folding and extending an antenna structure 100 capable of transmitting a WiGig band, and the method performs optimization on the antenna structure 100 via the following steps: first, as shown in step B1, disposing the antenna structure 100 on a head-mounted wireless transmission display device 400; and next, as shown in step B2, folding or extending the antenna structure 100 with respect to the head-mounted wireless transmission display device 400 to correspondingly reduce or increase the antenna structure 100 for transceiving a valid range of a wireless signal based on the WiGig technology.

In detail, in the aforesaid method, in order to ensure that no obscuration or reception error occurs between the signal transmitting end 600 and the signal transceiving ends 114 while taking the directivity between the signal transmitting end 600 and the signal transceiving ends 114 into consideration, the signal transceiving end 114 of the antenna structure 100 of the present invention may be arranged in the following two configurations, which are respectively as follows: "(1) the two signal transceiving ends 114 are arranged at left and right sides of the head of a user 500 with respect to the head of the user 500" and "(2) the two signal transceiving ends 114 are arranged at front and back sides of the head of the user 500 with respect to the head of the user 500".

Figure 5A:
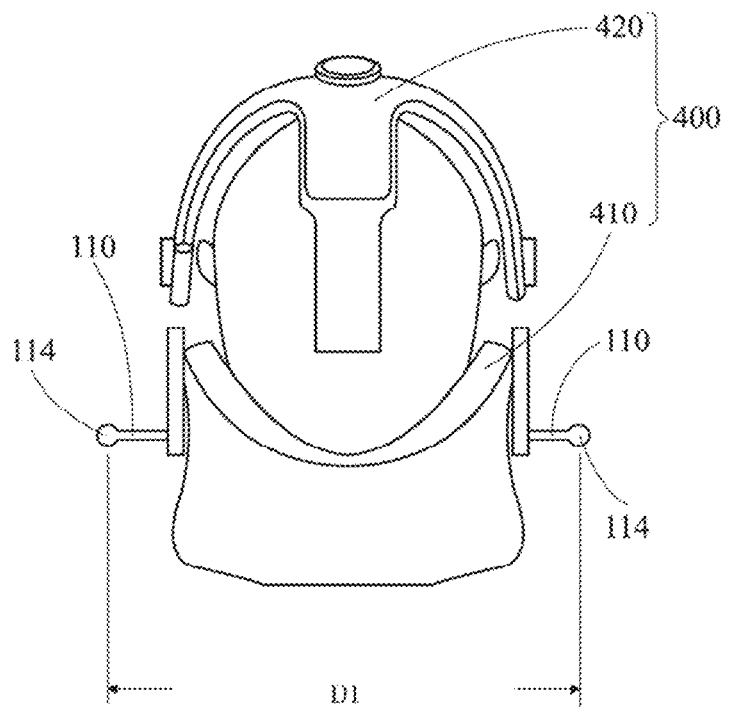
FIG. 5A is a top view of a first embodiment when the antenna structure is applied to a display screen of a head-mounted wireless transmission display device in the method according to the present invention.
Figure 5B:
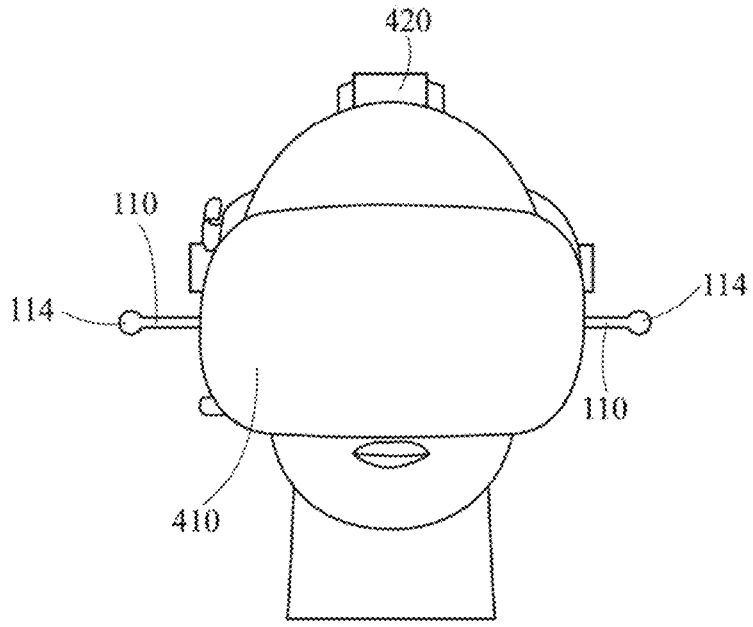
FIG. 5B is a front view of the first embodiment when the antenna structure is applied to the display screen of the head-mounted wireless transmission display device in the method according to the present invention.
Figure 5C:
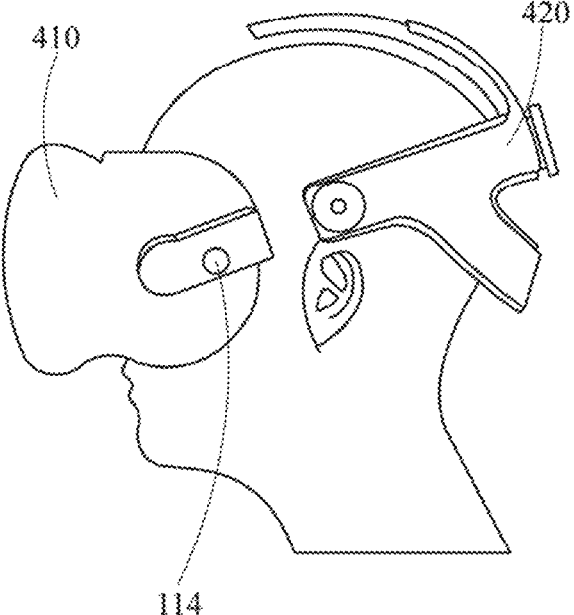
FIG. 5C is a side view of the first embodiment when the antenna structure is applied to the display screen of the head-mounted wireless transmission display device in the method according to the present invention.
Figure 6A:
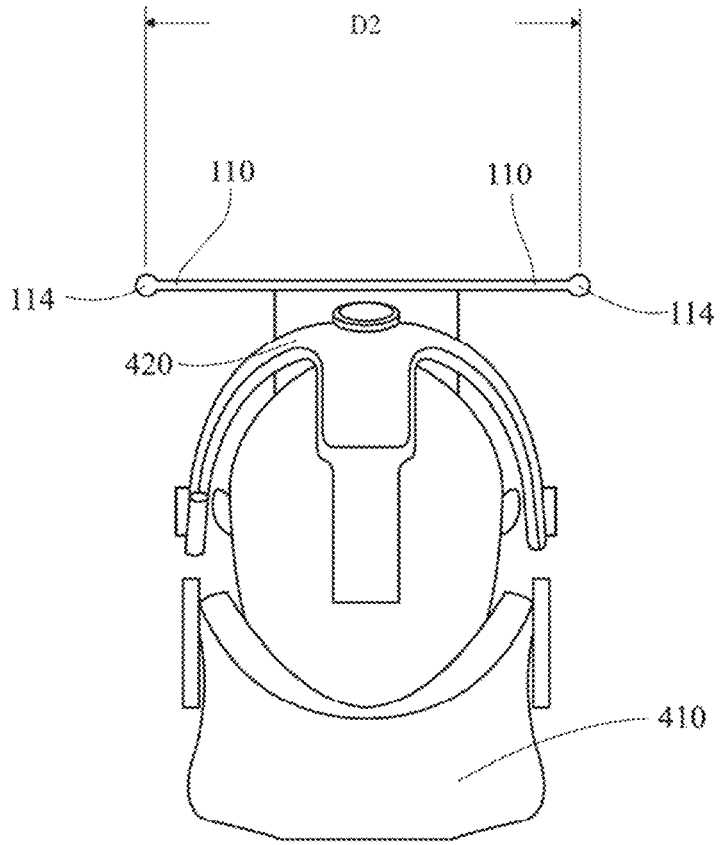
FIG. 6A is a top view of a second embodiment when the antenna structure is applied to an overhead device of the head-mounted wireless transmission display device in the method according to the present invention.
Figure 6B:
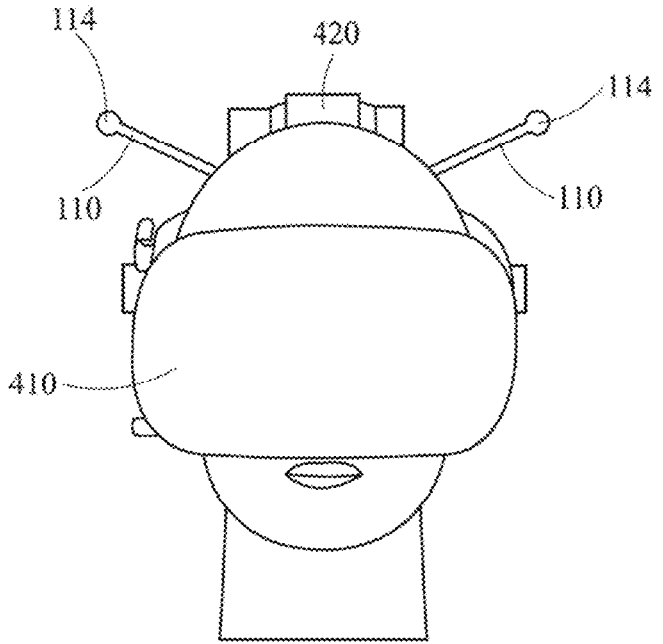
FIG. 6B is a front view of the second embodiment when the antenna structure is applied to the overhead device of the head-mounted wireless transmission display device in the method according to the present invention.
Figure 6C:
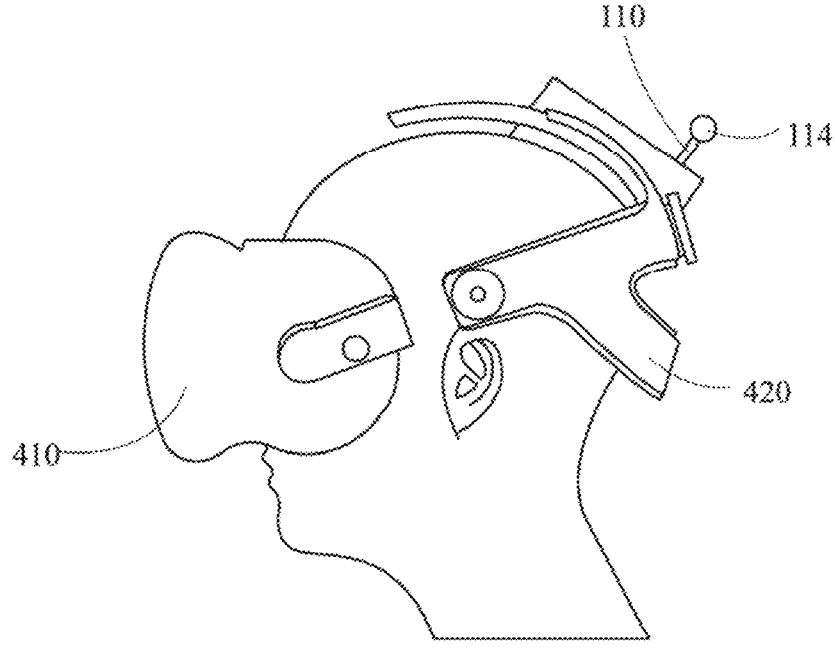
FIG. 6C is a side view of the second embodiment when the antenna structure is applied to the overhead device of the head-mounted wireless transmission display device in the method according to the present invention.

The aspect where "(1) the two signal transceiving ends 114 are arranged at left and right sides of the head of a user 500 with respect to the head of the user 500" may be further divided into a first embodiment shown in FIG. 5A to FIG. 5C and a second embodiment shown in FIG. 6A to FIG. 6C.

First, as depicted in FIG. 5A to FIG. 5C, an aspect where the two body portions 110 of the antenna structure 100 are respectively arranged at left and right sides of a display screen 410 of the head-mounted wireless transmission display device 400 is shown. As shown in FIG. 5A to FIG. 5C, when the two body portions 110 of the antenna structure 100 are respectively arranged at left and right sides of the display screen 410 of the head-mounted wireless transmission display device 400, and the signal transceiving end 114 of each of the body portions 110 is extended outward, a first distance D1 between the two signal transceiving ends 114 is greater than a width of the display screen 410. In this way, when the display screen 410 swings to the left and right sides, one of the two signal transceiving ends 114 may still maintain the communication with the front signal transmitting end 600 even if communication between the other one of the two signal transceiving ends 114 and the front signal transmitting end 600 is blocked, thereby maintaining the stability during the data flow reception.

As depicted in FIG. 6A to FIG. 6C, an aspect where the two body portions 110 of the antenna structure 100 are respectively arranged at left and right sides of an overhead device 420 of the head-mounted wireless transmission display device 400 is shown. As shown in FIG. 6A to FIG. 6C, when the two body portions 110 of the antenna structure 100 are respectively arranged at left and right sides of the overhead device 420 of the head-mounted wireless transmission display device 400, and the signal transceiving end 114 of each of the body portions 110 is extended outward, a second distance D2 between the two signal transceiving ends 114 is greater than a head width of the user 500. In this way, when the display screen 410 swings to the left and right sides, one of the two signal transceiving ends 114 may also maintain the communication with the front signal transmitting end 600 even if communication between the other one of the two signal transceiving ends 114 and the front signal transmitting end 600 is blocked, thereby maintaining the stability during the data flow reception.

It shall be noted that, although not shown in the figures, the antenna structure 100 in the embodiments of FIG. 5A to FIG. 5C and FIG. 6A to FIG. 6C may still have special arrangements involving the aforesaid first specific angle SA1, the second specific angle SA2 and the third specific angle SA3 or the like, and meanwhile have actions of automatically switching the signal reception strength, thereby preventing errors in the reception of the data flow.

Figure 7A:
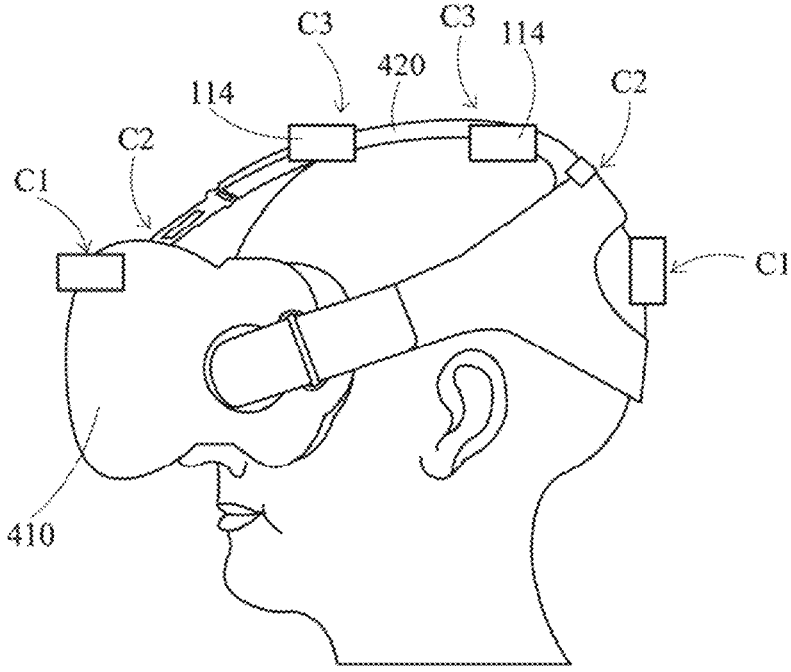
FIG. 7A is a schematic view of a third embodiment when the antenna structure is applied to the overhead device of the head-mounted wireless transmission display device in the method according to the present invention.
Figure 7B:
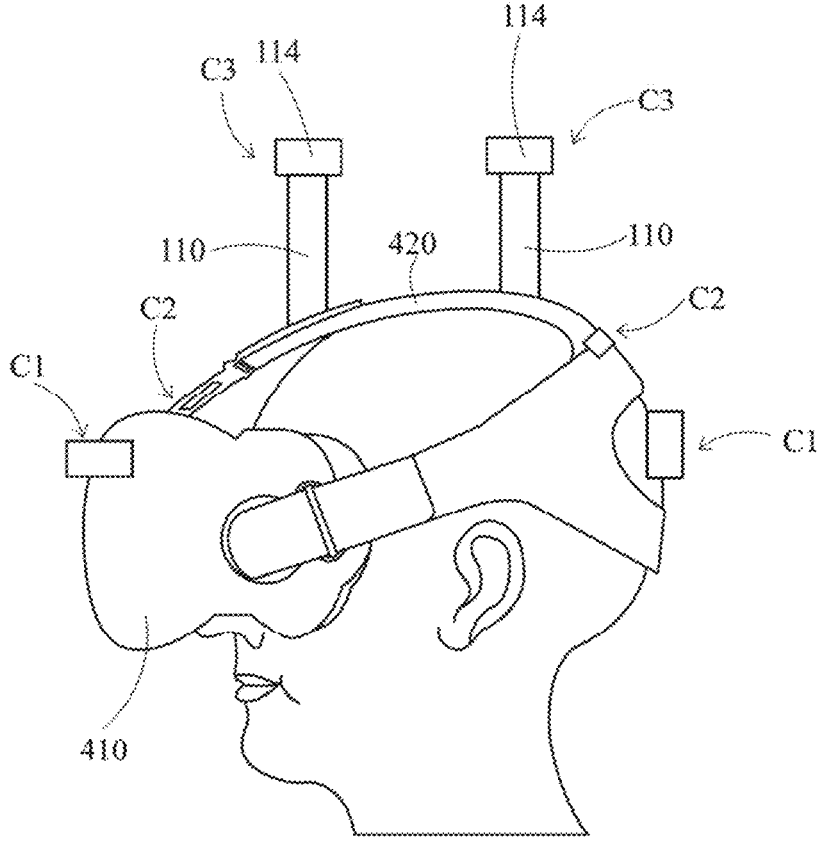
FIG. 7B is a schematic view of a fourth embodiment when the antenna structure is applied to the overhead device of the head-mounted wireless transmission display device in the method according to the present invention.
Figure 7C:
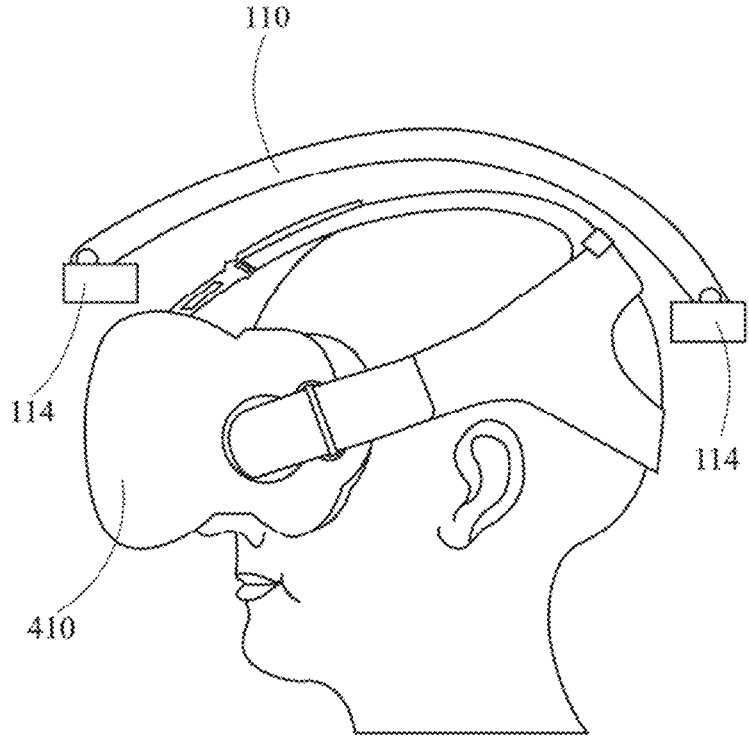
FIG. 7C is a schematic view of a fifth embodiment when the antenna structure is applied to the overhead device of the head-mounted wireless transmission display device in the method according to the present invention.

The aspect where "(2) the two signal transceiving ends 114 are arranged at front and back sides of the head of the user 500 with respect to the head of the user 500" may be further divided into a third embodiment of FIG. 7A, a fourth embodiment of FIG. 7B and a fifth embodiment of FIG. 7C.

In detail, as shown in the third embodiment of FIG. 7A, when the user 500 is playing a game requiring less intense actions via the head-mounted wireless transmission display device 400, the signal transceiving end 114 of the antenna structure 100 may be folded on the overhead device 420 to receive the data flow (i.e., the signal transceiving end 114 is in the closed state). In this case, the stability in data reception can be effectively ensured simply by disposing the two signal transceiving ends 114 slightly higher than the head of the user 500. Moreover, in the embodiment of FIG. 7A, the two signal transceiving ends 114 may be further disposed at corresponding positions indicated by C1, C2 and C3 respectively to satisfy the minimum signal reception requirement during static activities.

As shown in the fourth embodiment of FIG. 7B, when the user 500 is to perform relatively intense actions, the antenna structure 100 may be extended upward from the initial position indicated by C3 of FIG. 7A through stretching (i.e., the antenna structure 100 is in the spread state) so that the two signal transceiving ends 114 are respectively disposed at the front and back sides of the head of the user 500 at a specific height above the head of the user 500, thereby obtaining a better signal reception range. The aforesaid specific height is preferably 70 mm, but it is not limited thereto.

As shown in the fifth embodiment of FIG. 7C, the two signal transceiving ends 114 may also be extended respectively forward and backward so that the two signal transceiving ends 114 are across the head of the user 500 and disposed with a distance between the two signal transceiving ends 114 being larger than a width of the head of the user 500 in the front-back direction, thereby achieving the best effect of the signal reception coverage.

Figure 8:
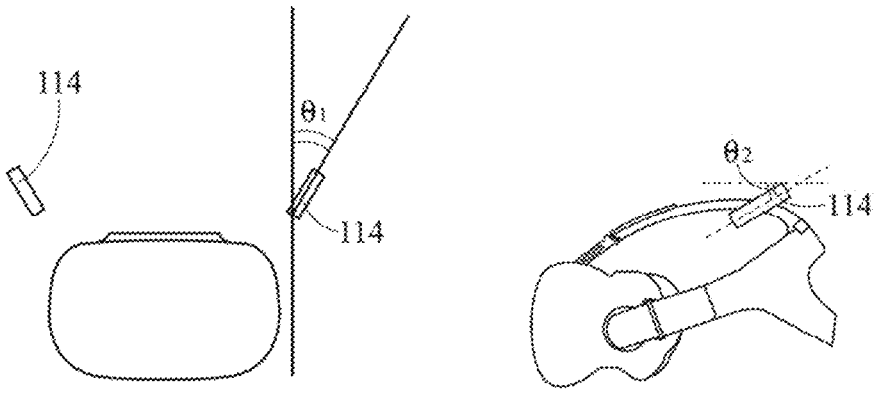
FIG. 8 is a schematic view illustrating angles at which the antenna structure is disposed with respect to a plumb line and a horizontal line after the antenna structure is applied to the overhead device of the head-mounted wireless transmission display device and worn by a user, in the method according to the present invention.

In another preferred embodiment of the antenna structure 100 of the present invention shown in FIG. 8, when the user 500 is wearing the head-mounted wireless transmission display device 400, each of the two signal transceiving ends 114 forms an angle of $\theta_1$ inclining upward and outward with respect to a plumb line, and the angle $\theta_1$ is preferably 15 degrees to 20 degrees. Each of the two signal transceiving ends 114 may also form an angle of $\theta_2$ inclining forward and downward with respect to a horizontal line, and the angle $\theta_2$ is preferably designed to be 45 degrees so that the received signal range has the best effect even when the user wearing the head-mounted wireless transmission display device 10 performs intense activities.

The present invention also claims an antenna structure capable of transmitting a WiGig band. In the embodiment as shown in FIG. 2A to FIG. 2D, an antenna structure 100 capable of transmitting a WiGig band comprises two body portions 110, each of the two body portions 110 has a pivoting end 112 and a signal transceiving end 114 opposite to the pivoting end 112. Each of the pivoting ends 112 is pivotally disposed on a base 300 at a first specific angle SA1 with respect to a horizontal plane, and each of the signal transceiving ends 114 is inclined downward by a second specific angle SA2 with respect to the body portion 110 and disposed away from the body portion 110.

Similarly, in the embodiments shown in FIG. 5A to FIG. 5C, FIG. 6A to FIG. 6C and FIG. 7A to FIG. 7C, the antenna structure 100 may also be pivotally disposed on a head-mounted wireless transmission display device 400. Since the embodiment where the antenna structure 100 is pivotally disposed on the head-mounted wireless transmission display device 400 has been described in detail in the above paragraphs, this will not be further described herein.

It shall be appreciated that, the aforesaid first specific angle SA1 is preferably between 0~20 degrees, and the second specific angle SA2 is preferably between 0~45 degrees, thereby achieving the best signal reception effect in the folded state.

Additionally, when the antenna structure 100 is extended relative to the base 300 or the head-mounted wireless transmission display device 400, the two body portions 110 are adapted to rotate a third specific angle SA3 outwardly relative to the base 300 or the head-mounted wireless transmission display device 400, and the third specific angle SA3 is between 0 and 60 degrees, thereby achieving the best signal reception effect in the extended state.

According to the above description, through the special antenna structure 100 and the method of folding and extending the antenna structure 100 claimed by the present invention, when a WiGig module 200 capable of transmitting a WiGig band is used to perform data flow transmission of the head-mounted wireless transmission display device 400, e.g., data flow transmission applicable in the fields of VR, AR or MR, the coverage of the signal reception range can be ensured by disposing the two signal transceiving ends 114 of the antenna structure 100 respectively at the left and right sides of the head of the user 500 or disposing the two signal transceiving ends 114 of the antenna structure 100 respectively at the front and back sides of the head of the user 500 even if the WiGig module 200 is limited in directivity, thereby effectively ensuring the stability in wireless transmission of the data flow and meanwhile making the antenna structure 100 convenient to be carried by the users.

What is claimed is:

1. An antenna structure capable of transceiving signals in a WiGig band for a head-mounted wireless transmission display device comprising a display screen, the antenna structure comprising:

at least two body portions, each of the body portions having at least a signal transceiving end, the body portions are respectively arranged at left and right sides of the display screen, and the signal transceiving ends of the body portions are extended outward from the left and right sides of the display screen respectively;

wherein a first distance between the two signal transceiving ends is greater than a width of the display screen.

2. The antenna structure capable of transceiving signals according to claim 1, wherein the signals are transceived over a 60 GHz frequency band.

3. The antenna structure capable of transceiving signals according to claim 1, wherein each of the signal transceiving ends is inclined downward by a specific angle with respect to the body portion and disposed away from the body portion.

4. The antenna structure capable of transceiving signals according to claim 1, wherein signal transceiving ends of the body portions are horizontally extended outward from the left and right sides of the display screen respectively.

5. The antenna structure capable of transceiving signals according to claim 1, wherein the head-mounted wireless transmission display device further comprises an overhead device.

6. An antenna structure capable of transceiving signals in a WiGig band for a head-mounted wireless transmission display device comprising a display screen, the antenna structure comprising:

at least two body portions, each of the body portions having a pivoting end and a signal transceiving end opposite to the pivoting end, each of the pivoting ends being pivotally disposed on the display screen;

wherein the body portions are respectively arranged at left and right sides of the display screen, and the signal transceiving ends of the body portions are extended outward from the left and right sides of the display screen respectively.

7. The antenna structure capable of transceiving signals according to claim 6, wherein a first distance between the two signal transceiving ends extended outward from the left and right sides of the display screen respectively is greater than a width of the display screen.

8. The antenna structure capable of transceiving signals according to claim 6, wherein each of the pivoting ends being pivotally disposed on the display screen at a first specific angle with respect to a horizontal plane, and each of the signal transceiving ends being inclined downward by a second specific angle with respect to the display screen and disposed away from the display screen.

9. The antenna structure capable of transceiving signals according to claim 6, wherein the signals are transceived over a 60 GHz frequency band.

10. The antenna structure capable of transceiving signals according to claim 6, wherein the two body portions can be extended forward and rearward relative to the display screen.

11. The antenna structure capable of transceiving signals according to claim 6, wherein the head-mounted wireless transmission display device further comprises an overhead device.

12. The antenna structure capable of transceiving signals according to claim 8, wherein the first specific angle is between 0 and 20 degrees, and the second specific angle is between 0 and 45 degrees.

*     *     *     *     *